Patented Jan. 19, 1954

2,666,749

UNITED STATES PATENT OFFICE 2,666,749

SPHEROIDAL ALUMINA

James Hoekstra, Evergreen Park, Ill., assignor to Universal Oil Products Company, Chicago, Ill., a corporation of Delaware No Drawing. Application November 21, 1951, Serial No. 257,634

6 Claims. (Cl. 252—448)

This is a continuation-in-part of my copending application Serial No. 148,509, filed March 8, 1950, and issued as Patent No. 2,620,314 on December 2, 1952.

This invention relates to the manufacture of alumina particles and more particularly to a novel method of manufacturing alumina particles of substantially spherical or spheroidal shape.

The use of alumina particles in substantially spherical or spheroidal shape offers numerous advantages, particularly when the alumina is used as an adsorbent, treating, refining or purifying agent, or as a catalyst or component of a catalyst for the conversion of organic compounds and still more particularly for the conversion of hydrocarbons. When used as a fixed bed of packing materials in a reaction or contacting zone, the spheroidal shaped particles permit more uniform packing and thereby reduce variations in pressure drop through the bed and accordingly reduce channeling which otherwise results in a portion of the bed being by-passed. Another advantage to the use of particles of this shape is that the spheres contain no sharp edges to break or wear off during processing or handling and, therefore, reduce the tendency to plug the process equipment. These advantages are magnified when the alumina particles are used as a moving bed, that is, when the particles are transported from one zone to another by either the reactants or by an extraneous carrying medium. It is thus seen that the use of particles of this shape permits a more effective utilization of the alumina.

Another very important advantage to the manufacture of alumina particles in accordance with the present invention is in the matter of economics. A prior method of obtaining alumina particles of uniform size and shape and of the desired hardness has been by means of a pilling operation. From the description to be hereinafter set forth, it will be readily apparent that the process of the present invention affords a considerably more economical method of manufacturing the alumina particles of substantially uniform size and shape.

Extensive investigations have been conducted on the manufacture of substantially spherical or spheroidal alumina particles by the method of passing droplets of alumina-containing solutions, sols or other mixtures into an immiscible liquid. These investigations have shown that satisfactory alumina particles are not as readily manufactured by this method as are some other inorganic oxide particles as, for example, silica spheres. In order to obtain satisfactory spherical particles of alumina, it is necessary to employ a sol which will set to a gel within a desired time interval. For example, when adding a conventional precipitating reagent, such as ammonium hydroxide, to an aluminum salt, such as aluminum chloride, aluminum nitrate, etc., a gelatinous precipitate sets immediately and, therefore, cannot be formed into the desired spherical shape by this method of operation. It has now been found that satisfactory alumina particles may be manufactured by this method provided certain critical features are adhered to. As will be set forth hereinafter, these features are extremely critical in order to obtain rigid particles which will not dissolve or crack during manufacture or use.

In one embodiment the present invention relates to a method of manufacturing alumina particles which comprises commingling an alumina sol with a weak base having a strong buffering action at a pH of from about 4 to about 10 and an increased rate of hydrolysis at an increased temperature without the evolution of gas, passing the resultant mixture in finely divided form into a water immiscible suspending medium maintained at an elevated temperature and retaining the alumina sol in said suspending medium until gelation occurs.

From the above embodiment it will be noted that, in accordance with the present invention, an alumina sol is commingled with a weak base of specific properties. This is one of the essential features of the present invention because this permits the preparation of a mixture of alumina sol and base which will not set immediately to a gelatinous mass but which, on the other hand, will set into a gel within a reasonable time. This time differential permits passing the mixture into a suspending medium so that the sol may assume the desired shape during passage through the suspending medium. The weak base for use in accordance with the present invention must be water soluble and have a strong buffering action at a pH of from about 4 to about 10 and preferably of from about 5 to about 8.5 and this means that the base, at a pH within this range, may be commingled with a relatively large amount of acidic material and still more substantially decrease the pH of the mixture. Therefore, for example, the conventional ammonium hydroxide cannot be used because it does not meet this requirement and, as hereinbefore set forth, a gelatinous mass is immediately precipitated.

It will be noted that the weak base for use in accordance with the present invention is defined as having a strong buffering action at a pH of from about 4 to about 10. When measured at room temperature, this strong buffering action is more pronounced at a pH of from about 4 to about 6. However, it is believed that at a higher temperature and particularly at the temperature utilized in the forming zone of the present process, this buffering effect may be more pronounced at a higher pH range which may be from about 5 to about 10. For example, it has been found that, when different samples of a weak base comprising hexamethylene tetramine were heated in admixture with different concentrations of hydrochloric acid and then cooled, the pH of the samples varied from the pH of similar samples which had not been so heated. It is appreciated that pH determinations are now made at room temperature because of the ease in so doing and the difficulties encountered when attempting to measure the pH at elevated temperatures. Therefore, it is understood that the pH range used in the present specification and claims is intended to include determinations made at room temperature as now generally practiced or at an elevated temperature by a modified analytical method.

The weak base also must have an increased rate of hydrolysis at an increased temperature without the evolution of gas. This permits commingling the weak base with the alumina sol at normal temperatures, which generally will be below about 110° F., without precipitation of a gelatinous mass. Upon heating the mixture to an elevated temperature of from about 120° to about 220° F., the alumina sets to a gel and this permits forming spheroidal alumina in the manner to be hereinafter set forth in detail. For example, it has been been found that upon commingling the alumina sol with a weak base comprising hexamethylene tetramine, gelation occurred in about 3-5 hours at room temperature of about 70° F. However, when heated to a temperature of 190° F., gelation occurred in 1 to 2 seconds. Still further, when refrigerated to a temperature of from about 32-35° F. gelation did not occur in 5 days. Therefore, it is important that the weak base has the property of an increased rate of hydrolysis at an elevated temperature so that the alumina sol and base may be commingled at a normal temperature without gelation but that gelation will occur within a reasonable time when passed into a heated suspending medium in the manner to be hereinafter set forth.

Still further, another requirement of the weak base is that it will not result in the evolution of gas at the elevated temperature employed in the process. For this reason, ammonium carbonate cannot be employed because it will result in the evolution of carbon dioxide which will disrupt the formation of the alumina spheres.

As another feature of the present invention, the suspending medium is water immiscible and is maintained at an elevated temperature in order to obtain the desired gelation within a reasonable time. As still another feature of the present invention, the particles are aged in a basic medium before being contacted with water. This is contrary to the results obtained when preparing some other inorganic oxide particles as, for example, in the preparation of silica spheres. One method used in the preparation of silica spheres is to utilize a body of water beneath the suspending medium to thereby transport the silica spheres from the forming zone to subsequent treatment. When this method is employed in the preparation of alumina spheres, the spheres dissolve in the water and thus are destroyed.

From the above brief description, it is apparent that the manufacture of satisfactory alumina particles by this method differs from the manufacture of some other inorganic oxide particles and, therefore, requires certain critical features as will be set forth hereinafter in detail.

In one of the preferred methods of preparing the alumina sol, aluminum metal is added to an aqueous solution of aluminum chloride and this mixture is subjected to heating and digesting at its boiling point. In general, this temperature will range from about 175° to about 220° F. The time of heating and digesting will depend upon the purity and particle size of the aluminum metal employed. With a substantially pure metal, the time may range from about 24 to about 72 hours or more and this time of heating and digesting will be reduced as impurities in the metal are increased. However, when the alumina is used for special preparations which will not permit the presence of impurities, it is preferred to utilize substantially pure aluminum metal, as well as substantially pure aluminum chloride. In some cases, the time of heating and digesting can be expedited by adding an extraneous metal which is lower than aluminum in the electromotive series of elements but here again the extraneous metal must be one that will not introduce an undesired impurity into the final alumina. Another method of expediting the heating and digesting is to pass oxygen into the mixture, as this serves to oxidize the hydrogen and thereby expedite the reaction.

The product resulting from the heating and digesting of the aluminum chloride and aluminum metal is referred to in the present specifications and claims as an alumina sol. The exact chemical composition of this product has not been definitely established but it may be represented approximately by the formula

$$4.5Al(OH)_3 \cdot AlCl_3$$

However, it is understood that the present invention is not limited to this specific composition, and that this product also may be referred to as a solution, colloidal solution, etc. In any event, this product contains less combined chlorine than is present in aluminum chloride ($AlCl_3$) and also is readily soluble in water.

It has been found that, in the preparation of the alumina sol, the mol ratio of aluminum chloride to aluminum metal is preferably within the range of from about 1:3 to about 1:5. Ratios of aluminum chloride to aluminum metal substantially outside of this range result in a sol which sets immediately into a precipitate upon the addition of the weak base or in the formation of gel spheres which are too soft and, therefore, unsatisfactory. Aluminum nitrate may be utilized in place of aluminum chloride but not necessarily with equivalent results.

As hereinbefore set forth, for certain uses it is desired that the alumina be of extremely high purity. Therefore, it is within the scope of the present invention to utilize other methods of preparing the alumina sol when the available aluminum metal contains an undesirable impurity which will remain in the alumina spheres. In one method of preparing a suitable alumina sol, a solution of an aluminum salt and particularly aluminum chloride may be electrolyzed in an electrolytic cell having a porous partition between the anode and the cathode. An acid anion deficient aluminum salt solution may then be recovered from the cathode compartment. In still another method, a solution of an aluminum salt may be subjected to treatment with an anion exchange agent which will remove some of the acid from the salt solution. It is understood, however, that these methods are not necessarily equivalent to that obtained by reacting the aluminum salt with aluminum metal.

The alumina sol as prepared in the above manner is a colorless to slightly yellow liquid and, as hereinbefore set forth, is readily soluble in water. An aqueous solution of the sol is prepared which contains from about 15% to about 35% by weight of alumina calculated as $Al_2O_3$. It has been found that certain sols having a concentration of alumina above 35% set to a gel immediately upon commingling with the basic reagent or may result in spheres which are brittle and crack easily. On the other hand, certain sols having a concentration below 15% result in spheres which are too soft and, therefore, unsatisfactory. However, as will be hereinafter set forth, the amount of water in the sol may be varied depending upon the amount of water in the weak base which is commingled with the sol.

As hereinbefore set forth, an essential feature of the present invention is in the selection of the weak base for commingling with the alumina sol in order to prepare a mixture which will set to a gel within a reasonable time and which will form alumina spheres of desired rigidity. It has been found that a particularly suitable weak base for use in accordance with the present invention is hexamethylene tetramine which is variously referred to as methenamine, formin, etc., and is represented by the formula $(CH_2)_6N_4$. Hexamethylene tetramine is readily prepared by the reaction of formaldehyde with ammonia. It has been found that approximately a 30% solution is particularly satisfactory for ease of handling and, when the water in the alumina sol is within the ranges hereinbefore set forth, results in a final mixture of desired water content. However, the hexamethylene tetramine solution may vary from about a 15% solution to about a 40% solution, the latter being substantially the saturation point. However, as the amount of water is increased in the hexamethylene tetramine solution, the amount of water in the alumina sol must be decreased accordingly, and vice versa.

Weak bases are also formed by the reaction of ammonia with other aldehydes such as acetaldehyde, proprionaldehyde, etc. but in view of the fact that these bases have a higher pH than the reaction product of ammonia with formaldehyde and that the pH obtained with ammonium and formaldehyde appears to be optimum, there does not appear to be any advantage in using aldehydes other than formaldehyde. However, in cases where the pH of the base is too high, acid may be commingled therewith in order to reduce the pH thereof to below about 8.5. Another satisfactory weak base comprises a mixture of ammonium acetate and ammonium hydroxide, the mixture having a pH of below about 8.5. It is understood that these bases are not necessarily equivalent and also that any other suitable weak base meeting the requirements hereinbefore set forth may be used in the present invention but not necessarily with equivalent results.

The solution of alumina sol and the solution of hexamethylene tetramine are commingled and, in a preferred embodiment of the invention, droplets are passed into an immiscible suspending medium. It has been found that equal volumes of the sol solution and of the hexamethylene tetramine solution are satisfactory but it is understood that this may vary somewhat. In general, however, the volume ratio of hexamethylene tetramine solution to alumina sol solution should be within the range of from about 3:1 to about 1:1.5 when the sol contains 26% $Al_2O_3$ and the hexamethylene tetramine solution is 30%. The use of a smaller amount of hexamethylene tetramine solution tends to result in soft spheres while, on the other hand, the use of larger volumes of hexamethylene tetramine solution results in spheres which tend to crack easily.

In the prior description, the preferred alumina sol has a chemical composition which is represented approximately by the formula $$4.5\ Al(OH)_3 \cdot AlCl_3$$

This alumina sol requires the use of a solution containing from about 15% to about 35% by weight of alumina calculated as $Al_2O_3$ which in turn requires the use of a volume ratio of hexamethylene tetramine solution to alumina sol of from about 3:1 to about 1:1.5.

In another embodiment of the invention the alumina sol may be prepared to contain a higher alumina to chlorine ratio by effecting the heating and digesting of aluminum chloride in the presence of higher concentrations of aluminum metal. These concentrations are within the range of from about 1:5 to about 1:7 mol ratios of aluminum chloride to aluminum metal. In this embodiment it is important to use a more dilute solution of the alumina sol, the solution containing from about 5% to about 15% by weight of alumina calculated as $Al_2O_3$. With these low concentrations of alumina in the sol having a higher alumina to chlorine ratio, satisfactory alumina spheres may be prepared by using smaller volume ratios of hexamethylene tetramine solution which may range from about 1:2 to about 1:20 volumes of hexamethylene tetramine solution to volumes of alumina sol solution. Satisfactory spheres have been prepared when using 1 volume of hexamethylene tetramine solution to 10 volumes of alumina sol prepared and diluted as hereinbefore set forth. However, it is understood that the volume concentrations of hexamethylene tetramine which may be used satisfactorily is dependent on the mol ratio of aluminum chloride to aluminum metal used in the heating and digesting step and on the concentration of alumina in the diluted solution. Higher volumes of hexamethylene tetramine solution are required with higher ratios of aluminum chloride to aluminum metal in the heating and digesting step and with higher alumina concentrations in the aqueous solution of the sol.

The two solutions are mixed preferably in a zone adapted to effect intimate mixing, and the mixture is then passed into the suspending medium. In a preferred method, the mixture is distributed in the form of droplets from a nozzle or orifice, the size of the nozzle determining the size of the alumina particles. When very small alumina particles are desired, the mixture may be distributed from a rotating disk.

In order to allow sufficient time for mixing and handling of the two solutions, the solutions are preferably mixed and dropped at substantially room temperature. However, the suspending medium must be at an elevated temperature in order to obtain gelation within the desired time. The temperature of the suspending medium may range from about 120° to about 220° F. and preferably is within the range of from about 190° to about 205° F. Temperatures below 120° F. require setting times that are too long and would necessitate a body of suspending medium which is excessive for practical purposes. On the other hand, temperatures above about 220° F. result in vaporization of the water and accordingly cracking of the spheres. The time in which the spheres remain in the suspending medium should be sufficient to form rigid spheres which will not crack or become distorted when removed from the suspending medium. It is understood that the time and temperature of suspension will be correlated to obtain the desired rigid spheres and that these factors are inversely related; that is, as the temperature is increased the time may be decreased.

Any suitable water immiscible suspending liquid which will not vaporize at these temperatures may be employed. A particularly suitable suspending liquid comprises organic liquids such as kerosene, Nujol, and similar materials which will allow the droplets to settle at a rate such that the alumina sets into a firm hydrogel during its passage through the fluid medium. While it is within the scope of the present invention to use a suspending liquid which is of higher density than the alumina spheres, in which case the alumina spheres rise upwardly through the suspending liquid, this method generally is not as preferred as is the use of a suspending medium of lower density than the alumina spheres so that the spheres descend to the bottom of the forming zone.

In a preferred embodiment of the invention, the alumina spheres are removed from the lower portion of the suspending liquid. Contrary to the experiences found with the other inorganic oxide spheres and particularly silica spheres, the alumina spheres must not be contacted with water at this stage of operation. The alumina spheres are water soluble and, therefore, would be destroyed upon being contacted with water. It, therefore, is another important feature of the present invention that the alumina spheres must be aged prior to being contacted with water. Furthermore, this aging must be in the presence of a basic medium and this, as hereinbefore set forth, comprises another essential feature of the present invention.

Another advantage to the process of the present invention is that spheres of different densities may be obtained by varying the aging. For example, when spheres of a density greater than about 0.7 are desired, these spheres being referred to herein as high density spheres, the alumina spheres are aged in a weak base of the same characteristics as the weak base originally used in preparing the spheres. This aging is effected at a temperature of from about 150° to about 212° F., preferably of from about 190° to about 210° F., for a period of at least 10 hours and preferably of from about 16 to about 24 hours or more. Thus, in a preferred embodiment the alumina spheres are aged in hexamethylene tetramine at a temperature and for a time as hereinbefore set forth.

When spheres of intermediate or high densities are desired, the spheres having densities of above about 0.5, the alumina spheres may be aged for at least 10 hours at a temperature above about 125° F. in an oil which preferably is the same as the suspending medium and then in ammonium hydroxide solution for at least 10 hours. The exact density of the spheres will depend upon the concentration and temperature of the ammonium hydroxide solution, higher densities being obtained with lower concentrations and with lower temperatures. However, it is understood that the spheres must be aged first in the oil for at least 10 hours before being aged in the ammonium hydroxide solution because otherwise the spheres will become soft or will crack.

When low density spheres are desired, that is, spheres having a density of below about 0.5, the alumina spheres are aged in an oil of the type used as the suspending medium at an elevated temperature and then in ammonium hydroxide solution at an elevated temperature. The elevated temperature is above about 125° F. and generally will not be greater than about 220° F. The time of aging is at least 10 hours in each case and the ammonium hydroxide solution preferably contains about 4 to 5% ammonia. The density of the spheres is again determined by the concentration of the ammonium hydroxide and, therefore, higher density spheres are obtained when a less concentrated solution or lower volume of solution is used. The variations in density due to variations in temperature and ammonia concentrations are further illustrated in the examples appended to the present specification.

In another embodiment of the invention the spheres may be aged at an elevated temperature in the presence of the suspending medium for a period of at least 10 and preferably of from about 16 to 24 hours or more at an elevated temperature of from about 150° to about 212° F. and preferably of from about 190° to about 210° F. In effect this may be considered as aging in a basic medium because the alumina spheres will contain hexamethylene tetramine and, therefore, are being aged in the presence of this reagent.

From the above description it is apparent that the preparation of satisfactory alumina spheres requires the use of a weak base of specific requirements and also aging of the spheres in a basic medium prior to contacting them with water. These features are extremely critical in order to prepare substantially spherical or spheroidal particles of satisfactory rigidity.

After the aging treatment, the spheres may be washed in any suitable manner. A particularly satisfactory method is to wash the spheres by percolation, either with upward or downward flow of water, and preferably with water containing a small amount of ammonium hydroxide and/or ammonium nitrate. After washing, the spheres may be dried at a temperature of from about 200° to about 600° F. for 2 to 24 hours or more or dried at this temperature and then calcined at a temperature of from about 800° to about 1400° F. for 2 to 12 hours or more, and then utilized as such or composited with other catalytic components. It is preferred that the spheres be dried slowly and also that the drying be effected in a humid atmosphere because this has been found to result in less breakage of the spheres. In another embodiment of the invention the spheres may be treated with other catalytic components prior to the drying or drying and calcining operations, and the final catalyst composite then may be subjected to further drying and calcining as desired.

In another embodiment of the invention and particularly when preparing high density spheres, the spheres may be given a quick wash, dried at a temperature of from about 200° to about 300° F. in a high humidity atmosphere, calcined at a temperature of from about 800° to about 1400° F. and further washed, preferably with water containing ammonium hydroxide and/or ammonium nitrate. Care must be exercised in preventing the spheres from absorbing moisture from the air which will occur before the spheres are subjected to high temperature drying, and this is particularly applicable to the high density spheres. Therefore, it is preferred to dry and calcine the high density spheres immediately after aging without permitting the spheres to cool.

As hereinbefore set forth, the alumina spheres may be used as an adsorbent or refining agent to treat organic compounds and also are particularly satisfactory for use as a component in catalysts. These spheres are particularly suitable for use as a component in the recently discovered "platforming catalyst" which comprises alumina, from about 0.01% to about 1% by weight of platinum and from about 0.1% to about 8% by weight of combined halogen. Another particularly suitable catalyst comprises alumina composited with from about 5 to about 40% by weight of a compound and particularly an oxide of one or more elements in the left hand columns of groups 4, 5 and 6 of the periodic table, which catalysts are utilized in reforming, hydrogenation, dehydrogenation, dehydrocyclization, etc. of hydrocarbons or other organic compounds. Typical catalysts of this type include alumina-chromia, alumina-molybdena, alumina-vanadia, etc.

The platforming catalyst is utilized for the treatment of a gasoline at a temperature of from about 800° to about 1100° F. at a superatmospheric pressure of from about 100 to about 1000 pounds per square inch in the presence of hydrogen. Dehydrogenation reactions are effected at temperatures of from about 800° to about 1200° F. and usually at moderate superatmospheric pressures which are below about 50 pounds per square inch. Hydrogenation reactions are effected at lower temperatures and higher pressures which generally may range from about 200° to about 600° F. and pressures of from about 200 to about 1000 pounds or more per square inch.

The alumina spheres may be used as contacting agents or as treating or refining agents for organic compounds and, thus, may find utility in effecting dehydration reactions, dehydrohalogenation reactions, desulfurization reactions, etc.

The following examples are introduced to illustrate further the novelty and utility of the present invention but not with the intention of unduly limiting the same.

Example I

In an attempt to form an alumina mixture which would set to a gel within a reasonable time, aqueous ammonium hydroxide solutions, both dilute and concentrated, were added to aqueous solutions of aluminum chloride hexahydrate. Gelatinous precipitates set immediately and, therefore, this method could not be utilized in preparing spheres by the technique of passing droplets of the mixture into a suspending medium.

Example II

From the results of Example I it appeared necessary to form an alumina sol containing a higher ratio of aluminum to chloride ion than is contained in aluminum chloride. Such a sol was prepared by placing 120 grams of aluminum metal cuttings in a solution of 241 grams of aluminum chloride hexahydrate in 600 ml. of water, and heating the mixture. This resulted in an aqueous sol containing about 16 equivalents of aluminum and 3 equivalents of chloride ion in a volume of 800 ml.

Ammonium hydroxide was added to the alumina sol as prepared in the above manner and here again a gelatinous precipitate set immediately.

Example III

The alumina sol as prepared according to Example II was utilized in the preparation of satisfactory substantially spherical particles in the following manner. A solution of 30% by weight of hexamethylene tetramine in water was mixed in about equal proportions with another portion of the sol as prepared in Example II. This resulted in a slightly viscous mixture which slowly set to a firm gel. Attempts to pass droplets of this mixture into an oil bath proved impractical because the sol would not set into a firm gel during passage through the oil. However, upon heating the oil bath to a temperature within the range of from about 195° to 210° F., firm hydrogel spheres were formed.

Example IV

The spheres formed according to Example III were placed in water in an attempt to wash the spheres. However, the spheres dissolved in the water and, therefore, it was apparent that the spheres needed some treatment before being contacted with water.

An attempt was then made to dry the spheres, either partially or completely, prior to washing, but this method proved unsatisfactory because, even after partial drying, the spheres were still soluble in water. Complete drying resulted in fracturing of the spheres.

Example V

It was found that aging of the spheres formed according to Example III in a concentrated solution of hexamethylene tetramine (50 to 100 grams of hexamethylene tetramine per 100 ml. of water) at a temperature of from about 195° to about 210° F. for 16 hours resulted in the formation of white opaque spheres. The spheres aged in this manner were then washed with water and it was found that these spheres did not dissolve in the water but retained their rigidity.

Example VI

A continuous process for the manufacture of spherical particles was developed. Several batches of alumina sol (26–28% $Al_2O_3$) were prepared in substantially the same manner set forth in Example II. A hexamethylene tetramine solution was prepared by adding sufficient water to 291 grams of hexamethylene tetramine to form 1 liter of solution. The sol and solution were passed, each at a rate of 12 cc. per minute, into a small mixer having a baffle rotated by means of a motor. Droplets were emitted from the bottom of the mixer into a forming chamber of 2 inch diameter and 5 feet long. The tip of the nozzle from which the mixture was dropped was about 2 mm. in diameter, and the forming chamber was filled with Nujol up to about 1½ inch below the nozzle tip. The forming chamber was maintained at a temperature of 195° F. by means of electrical heating elements surrounding the chamber. The droplets assumed substantially spherical shape during passage through the Nujol and were removed from the lower portion of the forming chamber by means of a stream of Nujol maintained at a temperature of 195° F. The Nujol stream containing the spheres was passed into another zone in which a level of Nujol was maintained. A basket was submerged beneath the level of Nujol in this second zone and this basket served to collect the spheres and also to prevent the spheres from contacting the atmosphere. The second zone likewise was maintained at a temperature of about 195° F. When approximately 1100 grams of alumina spheres, calculated on a dry basis, were accumulated, the basket was removed from the second zone and the spheres were aged in Nujol at substantially the same temperature for 16 hours.

The partially aged spheres were then further aged in an ammonium hydroxide solution, formed by adding sufficient water to 1200 ml. of concentrated ammonium hydroxide to cover the spheres, for 24 hours at a temperature of 203° F. The aging solution was then drained and the spheres were washed with water containing a small amount of ammonium hydroxide (20 ml. of ammonium hydroxide per 5 gallons of water). The washed spheres were then partially dried at a temperature of 248° F. in an atmosphere of high humidity. The dried spheres were immediately calcined thereafter at a temperature of 1200° F. As hereinbefore set forth the spheres were not permitted to cool between the drying and calcining steps, because spheres allowed to cool before calcining tend to absorb moisture which causes them to crack. The resultant spheres had a diameter of about $\frac{3}{32}$ inch and a density of 0.49. The alumina spheres prepared in the above manner were well formed, rigid particles and could be exposed to the atmosphere and washed with water without substantial breakage.

*Example VII*

Satisfactory alumina spheres were prepared from an alumina sol, prepared in substantially the same manner as described in Example II, and utilizing an ammonium acetate-ammonium hydroxide mixture as the weak base. An ammonium acetate solution was prepared by dissolving 150 grams of ammonium acetate in 100 ml. of water and regulating the pH to 8.4 with ammonium hydroxide. This ammonium acetate-ammonium hydroxide solution and the alumina sol solution were supplied to a continuous mixer, and droplets of the resultant mixture were passed into a body of Nujol maintained at a temperature of about 203° F. The resultant spheres were subsequently aged in a 5% ammonium hydroxide solution at approximately 207° F. for 5 hours, after which the mixture was allowed to cool to room temperature. The spheres were withdrawn from the aging solution and then were washed with water containing a small amount of ammonium hydroxide, after which the speres were dried in a humid atmosphere at 230° F. for about 5 hours, then at about 285° F. for about 1½ hours and finally at about 300° F. for 3 hours. The spheres were subsequently calcined at 1200° F. for 3 hours.

The spheres formed in the above manner were well formed and rigid so that they could be handled further without undue breakage.

I claim as my invention:

1. A method of preparing substantially spherical alumina particles which comprises forming alumina sol, commingling said sol with water to form a mixture containing from about 15% to about 35% by weight of alumina, separately commingling ammonium acetate with water and adding ammonium hydroxide thereto in an amount to regulate the pH of the resultant mixture to below about 8.5, commingling said ammonium acetate-ammonium hydroxide solution with the alumina sol at a temperature below about 110° F. and maintaining the mixture at below about 110° F. to prevent gelation thereof, thereafter passing droplets of the ungelled mixture into an oil bath maintained at a temperature of from about 120° to about 220° F., retaining the droplets in said oil bath until the droplets set to hydrogel spheres, and immediately thereafter aging said hydrogel spheres in a basic medium.

2. The method of claim 1 further characterized in that said aging is effected in the presence of an ammonium acetate-ammonium hydroxide solution.

3. The method of claim 1 further characterized in that said aging is effected first in oil at a temperature of from about 120° to about 220° F. for at least 10 hours and then in ammonium hydroxide solution for at least 10 hours.

4. In the preparation of shaped alumina particles wherein an alumina sol is introduced into a water-immiscible suspending medium for gelation therein, the method which comprises commingling with the alumina sol an ammonium acetate-ammonium hydroxide solution having a pH value below about 8.5, maintaining said sol and solution at below gelation temperature during the commingling thereof and until introduction thereof to said suspending medium, introducing the resultant ungelled mixture in the form of droplets into said suspending medium and maintaining the latter at a gelation temperature of from about 120° F. to about 220° F., and retaining the droplets in the suspending medium until gelation occurs.

5. In the preparation of shaped alumina particles wherein an alumina sol is introduced into a water-immiscible suspending medium for gelation therein, the method which comprises commingling with the alumina sol an ammonium acetate-ammonium hydroxide solution having a pH value below about 8.5, maintaining said sol and solution in unheated state during the commingling thereof and until introduction thereof to the suspending medium to prevent gelation of the mixture before entering the suspending medium, introducing the resultant ungelled mixture in the form of droplets into said suspending medium and maintaining the latter at a gelation temperature of from about 120° F. to about 220° F., and retaining the droplets in the suspending medium until gelation occurs.

6. In the preparation of shaped alumina particles wherein an alumina sol is introduced into a water-immiscible suspending medium for gelation therein, the method which comprises commingling with the alumina sol an ammonium acetate-ammonium hydroxide solution having a pH value below about 8.5, maintaining said sol and solution at a temperature below about 110° F. during the commingling thereof and until introduction thereof to the suspending medium to prevent gelation of the mixture before entering the suspending medium, introducing the resultant ungelled mixture in